(12) United States Patent
Karchov

(10) Patent No.: US 7,844,816 B2
(45) Date of Patent: Nov. 30, 2010

(54) RELYING PARTY TRUST ANCHOR BASED PUBLIC KEY TECHNOLOGY FRAMEWORK

(75) Inventor: David Karchov, Rockville, MD (US)

(73) Assignee: International Business Machines Corporation, Armonk, NY (US)

( * ) Notice: Subject to any disclaimer, the term of this patent is extended or adjusted under 35 U.S.C. 154(b) by 1212 days.

(21) Appl. No.: 11/148,772

(22) Filed: Jun. 8, 2005

(65) Prior Publication Data
US 2006/0282670 A1    Dec. 14, 2006

(51) Int. Cl.
*H04L 29/06* (2006.01)
*H04L 9/32* (2006.01)

(52) U.S. Cl. .................. 713/156; 713/175; 726/10
(58) Field of Classification Search ........... 713/156, 713/175; 726/10; 380/277
See application file for complete search history.

(56) References Cited

U.S. PATENT DOCUMENTS

| | | | |
|---|---|---|---|
| 4,897,875 A | 1/1990 | Pollard et al. | |
| 5,745,574 A | 4/1998 | Muftic | |
| 5,922,074 A | 7/1999 | Richard et al. | |
| 5,982,898 A | 11/1999 | Hsu et al. | |
| 6,249,873 B1 | 6/2001 | Richard et al. | |
| 6,304,974 B1* | 10/2001 | Samar | 726/10 |
| 6,321,339 B1 | 11/2001 | French et al. | |
| 6,349,338 B1 | 2/2002 | Seamons et al. | |
| 6,442,688 B1 | 8/2002 | Moses et al. | |
| 6,484,258 B1* | 11/2002 | Haverty | 713/155 |
| 6,754,829 B1 | 6/2004 | Butt et al. | |
| 6,789,193 B1 | 9/2004 | Heiden | |
| 7,321,970 B2* | 1/2008 | Watkins et al. | 713/156 |
| 2001/0034836 A1* | 10/2001 | Matsumoto et al. | 713/176 |
| 2003/0028495 A1* | 2/2003 | Pallante | 705/78 |
| 2003/0115142 A1 | 6/2003 | Brickell et al. | |
| 2003/0177390 A1* | 9/2003 | Radhakrishnan | 713/201 |
| 2003/0191936 A1* | 10/2003 | Kawatsura et al. | 713/156 |
| 2003/0237004 A1* | 12/2003 | Okamura | 713/201 |

FOREIGN PATENT DOCUMENTS

WO    WO 2004/080550 A2    9/2004

OTHER PUBLICATIONS

Batarfi, O., "Certificate Validation in Untrusted Domains," School of Computing Science, University of Newcastle upon Tyne, Proceedings of "On the Move to Meaningful Internet Systems 2003," pp. 1057-1068.
Chadwick, D.W. et al., "The PERMIS X.509 Role Based Privilege Management Infrastructure," SACMAT '02, Jun. 3-4, 2002, Monterey, California, pp. 135-140.
Hess, A. et al., "Content-Triggered Trust Negotiation," ACM Transactions on Information and System Security, vol. 7, No. 3, Aug. 2004, pp. 428-456.
Keoh, S.L. et al., "Towards Flexible Credential Verification in Mobile Ad-hoc Networks," POMC '02, Oct. 30-31, 2002, Toulouse, France, pp. 58-65.

* cited by examiner

*Primary Examiner*—Emmanuel L Moise
*Assistant Examiner*—Ali S Abyaneh
(74) *Attorney, Agent, or Firm*—Douglas Lashmit; Hoffman Warnick LLC

(57) ABSTRACT

A public key (PK) framework for allowing a relying party to act as a trust anchor to authenticate a subscriber. The framework provides a directory system under the control of the relying party, wherein the directory system includes: a storage system for storing certificates received from subscribers in a database, wherein the certificates are issued by a plurality of different certificate authorities; a management system for managing records in the database associated with subscribers; and a validation system that allows the relying party to retrieve certificates from the database in order to authenticate subscribers.

15 Claims, 3 Drawing Sheets

RELYING PARTY TRUST ANCHOR BASED PUBLIC KEY TECHNOLOGY FRAMEWORK

BACKGROUND OF THE INVENTION

1. Technical Field

The present invention relates generally to digital security, and more specifically relates to a Public Key technology framework in which the relying party controls the trust anchor.

2. Related Art

A PKI (public key infrastructure) enables users of a basically unsecure public network such as the Internet to securely and privately exchange data and execute transactions through the use of a public and a private cryptographic key pair, where the public keys are obtained and shared through a trusted Certificate Authority. Using the public key infrastructure users can be uniquely authenticated. A Certificate Authority uses a certificates data repository, usually an LDAP (Lightweight Directory Access Protocol) Directory for storing user certificates and information on revoked certificates.

In the traditional PKI model, a two factor authentication scenario is commonly used in which the user uses: (1) a private key/certificate issued by the trusted Certificate Authority (CA), and (2) a user ID (UID)/password issued by the relying party. A typical embodiment of this process includes the following steps:

1. The relying party challenges the user for the user's UID and password;
2. The user responds with the UID and password;
3. The relying party verifies the presented UID and password against the information stored securely in a credentials database.
4. The user is authenticated to the relying party over SSL using a private key and the corresponding certificate;
5. The relying party web server verifies the following information:
   a. the certificate is not expired,
   b. the certificate is signed by the trusted issuing CA,
   c. the certificate is not revoked based on a Certificate Revocation List (CRL) analysis (where the CRL is created and controlled by the issuing CA);

Traditional PKI models consider the issuing party CA as a trust anchor. This means that a relying party expects that the CA creates legitimate certificates that uniquely bind information about a subscriber (end-user) to a public key. The model also expects that the CA verifies the subscriber's identity and verifies that the subscriber's private key. is generated and stored securely before the CA issues a certificate. In traditional PKI, relying parties explicitly trust the CA under all circumstances.

In distributed multi-domain PKI models, multiple CAs exist that have trust relationships (hierarchy, cross certification, mesh, etc.) set up between them. During certificate validation, PKI-enabled applications must first try to discover a trust path that reaches to the level of the CA which is a trust anchor, and then must verify the certificate revocation status by checking a CRL/ARL (Authority Revocation List) issued by the trusted CA. In the general case, the relying party needs to know the CRL/ARL location, format and access for each CA. This can present significant challenges if many CAs exist, as well as if certificates are self-signed.

Some of these challenges include the fact that: (1) subscribers need to be securely authenticated by relying parties using public key technology; (2) subscribers can use certificates issued by any CA, which can be either trusted or not trusted; and (3) subscriber certificates can be self-signed (using, e.g., PGP, OpenSSL, or other proprietary applications).

The traditional PKI model cannot effectively meet these requirements because: (1) issuing CAs are not considered to be trusted (in a sense of trust anchor) by a relying party, and they may not have any trust relationships defined between them; (2) self-signed and CA signed certificates cannot be easily accommodated in the same environment; and (3) since CAs are not trusted by the relying party, they cannot be used by the relying party for a certificate revocation status validation.

Thus, in the case of heterogeneous complex large scale PKI that encompasses self-signed certificates and independent CAs whose number can be unpredictable and vary over time, the traditional PKI model cannot provide a consistent level of trust and cannot use those CAs as well as self-signed certificates as trust anchors. Accordingly, a need exists for a PKI model that can effectively handle multiple CAs, as well as self-signed certificates.

SUMMARY OF THE INVENTION

The present invention addresses the above-mentioned problems, as well as others, by providing a Public Key technology framework that is based on defining a trust anchor that is controlled by the relying party. In this model, the relying party securely binds a registered user to the corresponding user certificate. User certificates are stored in the user credentials repository controlled by the relying party. Subscribers in this framework are responsible for the security of their private keys and for obtaining certificates (similar to traditional PKI). A relying party, however, is responsible for verification of the subscriber's identity and for subscriber account lifecycle management (registering, suspending, deleting, updating, etc., certificates presented by users) in accordance with the relying party's user accounts provisioning policies, standards, regulations, and procedures.

In a first aspect, the invention provides a public key (PK) framework having a relying party user authentication system for allowing a relying party to authenticate a user, wherein the PK framework places user credentials under the control of the relying party, and wherein the relying party user authentication system includes: a storage system for storing certificates received from users in a user credentials data repository, wherein the certificates are issued by a plurality of different certificate authorities; a management system for managing records in the user credentials data repository associated with users; and a validation system that allows the relying party to retrieve certificates from the user credentials data repository in order to authenticate users.

In a second aspect, the invention provides a relying party authentication server that authenticates users using public key infrastructure (PKI) credentials, wherein the relying party authentication server includes a plurality of trust anchors for authenticating the users, and wherein the trust anchors include: a key store containing trusted certificate authority certificates; a directory of registered certificates; and a custom web services user credentials verification application.

In a third aspect, the invention provides a method for allowing a relying party to authenticate a user within a public key (PK) framework in which user credentials are under the control of the relying party, comprising: providing a user credentials data repository that is under the control of a relying party; storing certificates received from users in the user credentials data repository, wherein the certificates are issued by a plurality of different certificate authorities; receiving a request at the relying party to authenticate a user; and retrieving a certificate from the user credentials data repository in order to authenticate the user.

In a fourth aspect, the invention provides a method for authenticating users using public key infrastructure (PKI) credentials, comprising the steps of: receiving a request to authenticate a user at a relying party authentication server; and selecting at least one trust anchor from a plurality of trust anchors to authenticate the user, wherein the plurality of trust anchors for authenticating the subscriber include: a key store containing trusted certificate authority certificates; a directory of registered certificates; and a custom web services user credentials verification application.

In a fifth aspect, the invention provides a method for deploying a relying party user authentication application in which user credentials are under the control of a relying party, comprising: providing a computer infrastructure being operable to: store certificates received from users in a user credentials data repository that is under the control of the relying party, wherein the certificates are issued by a plurality of different certificate authorities; manage records in the user credentials data repository associated with the relying party; and allow the relying party to retrieve certificates from the user credentials data repository in order to authenticate users.

BRIEF DESCRIPTION OF THE DRAWINGS

These and other features of this invention will be more readily understood from the following detailed description of the various aspects of the invention taken in conjunction with the accompanying drawings in which.

DETAILED DESCRIPTION OF THE INVENTION

Public Key Framework Overview

In a first embodiment of the present invention a framework is provided in which a relying party uses a Trusted Entities Directory (TED) associated with a user credentials data repository containing registered entities as a trust anchor. The user credentials data repository stores certificates for each user associated with the relying party. In this illustrative embodiment, a user, referred to as a subscriber, subscribes to a service provided by the relying party. In addition to storing certificates in the user credentials data repository, subscriber records may be maintained that include management information, such as a subscriber status, e.g., added, registered, deleted, etc.

To ensure security, the certificates are securely delivered to the user credentials data repository using a user registration process, which provides a binding step. The subscribers can be authenticated by relying applications using, for example, secure sockets layer (SSL) with mutual authentication, and the subscribers' status can be validated by relying applications using corresponding TED records information.

This approach is similar to using a password for user authentication, but in this case, asymmetric key cryptography technology is used instead with no need to store password based secure information. Certificates stored in the TED are publicly available. Thus, while they need to be protected in the TED from unauthorized replacement or deletion, but they do not need to be encrypted. This significantly limits the relying party's liability for compromised user credentials.

Each subscriber's private key is maintained under complete control of the subscriber and thus should never leave the subscriber's possession. Subscribers may use any media (e.g., a token, a smart card, a browser, etc.) for storing their PKI credentials. This framework does not require checking a certificate revocation or expiration status since the issuing CAs are not considered to be the trust anchors, unless the relying party decides to use a combined approach.

Figure 1:
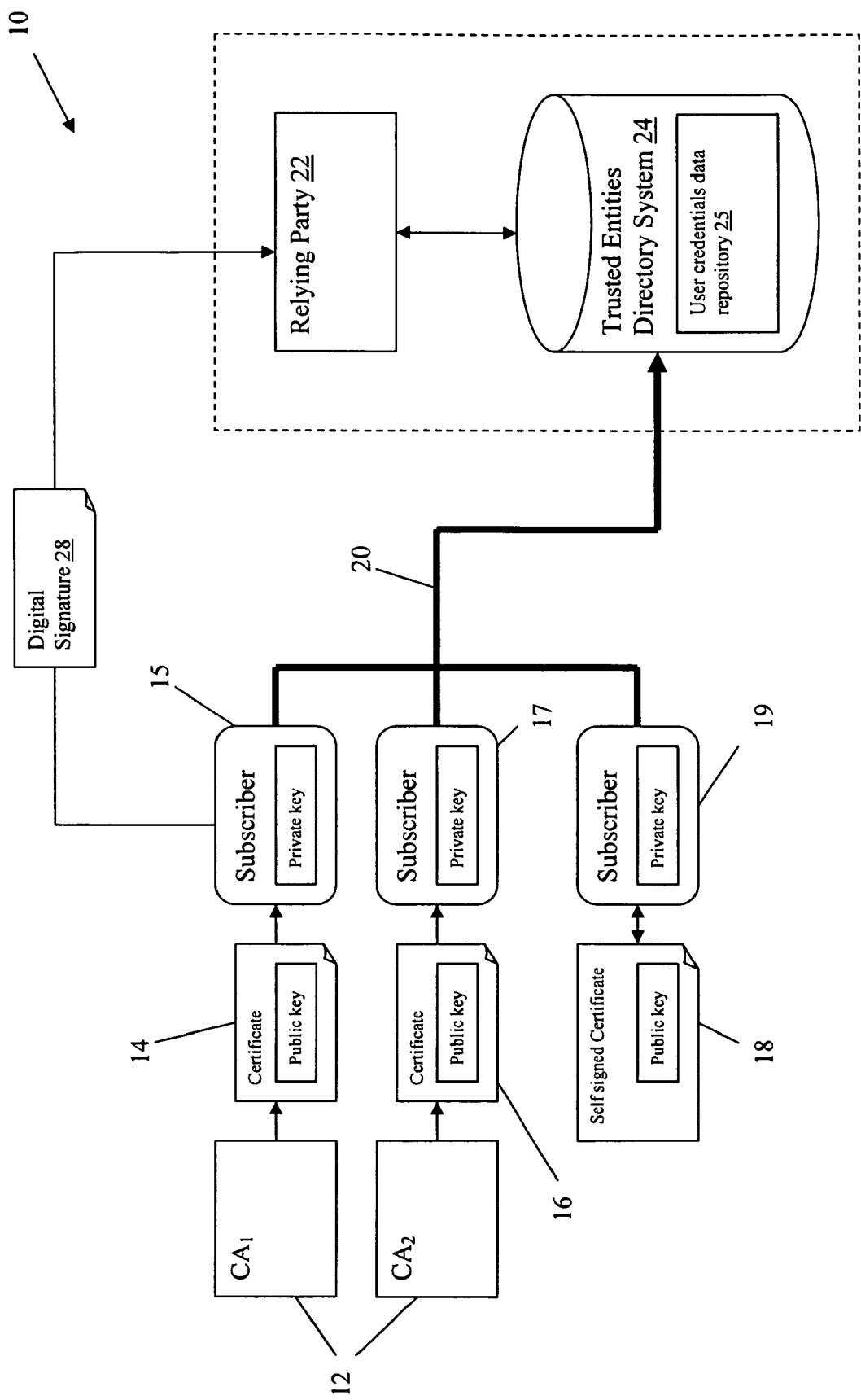
FIG. 1 depicts a PK technology framework in accordance with the present invention.

Referring now to FIG. 1, an illustrative embodiment of a public key technology framework 10 in accordance with the present invention is shown. In this example, subscribers 15 and 17 receive certificates 14, 16 from certificate authorities 12, $CA_1$ and $CA_2$, respectively. Subscriber 19 has a self signed certificate 18. Accordingly, the source of each certificate 14, 16, 18 is unique. In this framework, each of the subscribers 15, 17, 19 transfers their certificates 14, 16, 18 to a trusted entities directory (TED) system 24, which is controlled by relying party 22. For the purposes of this embodiment, the term "control" means that relying party 22 has exclusive storage, management and access rights to the information in TED system 24. TED system 24 includes a user credentials data repository 25 for storing and managing certificates and subscriber records. In this embodiment, the transfer of certificates into user credentials data repository 25 is preferably done over a secure channel 20 (e.g., using SSL with a one-way server authentication, etc.). The transfer may be done, e.g., when a subscriber subscribes to a service provided by the relying party. For instance, the relying party 22 may provide online retail sales, and the subscriber may be a customer. When the subscriber registers with the relying party 22, e.g., at the relying party's web site, a certificate may be transferred from the subscriber and stored in user credentials data repository 25.

When the relying party 22 needs to verify a subscriber 15, the relying party 22: (1) obtains a digital signature (e.g., a message digest encrypted with the subscriber's private key) 28 of the subscriber 15, (2) accesses the user credentials data repository 25 to obtain the public key for the subscriber 15, and (3) decrypts the digital signature 28 to verify the subscriber 15.

Figure 2:
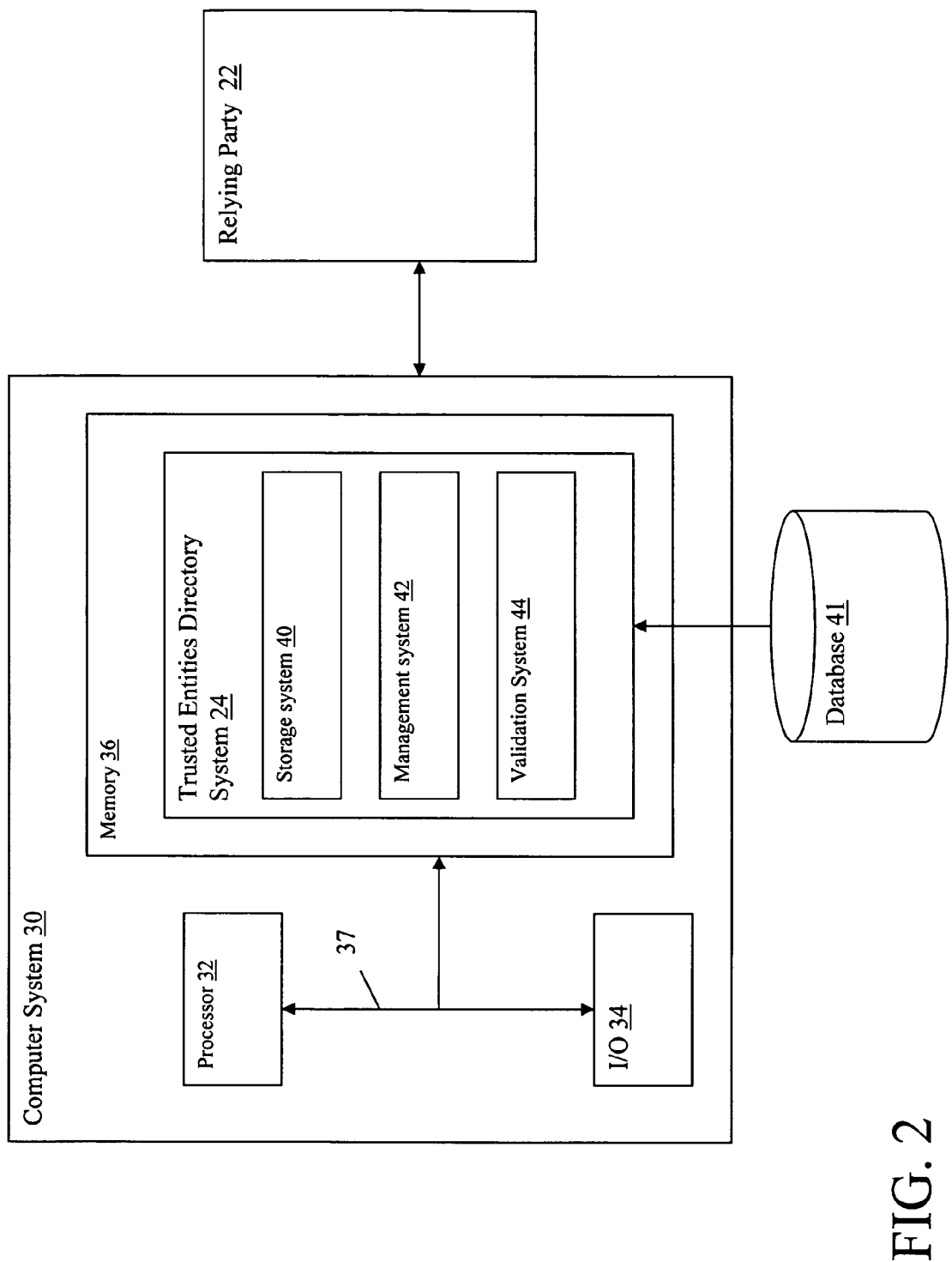
FIG. 2 depicts a directory system in accordance with the present invention.

Referring now to FIG. 2, a computer system 30 is shown for implementing a trusted entities directory system 24, which acts as the trust anchor for the framework. Trusted entities directory system 24 generally includes a storage system 40 for storing certificates in database 41, a management system 42 for managing certificate and subscriber account information, and a validation system 44 for searching and retrieving certificates from the database 41. The storage system 40 allows subscribers to securely deliver their certificates in a subscriber record the database 41. As noted above, each subscriber record can include management information, such as a subscriber status (added, registered, deleted, etc.). Management system 42 allows the relying party 22 and/or subscriber to manage their subscriber record.

Computer system 30 could be implemented as part of a server. Computer system 30 generally includes a processor 32, input/output (I/O) 34, memory 36, and bus 37. The processor 32 may comprise a single processing unit, or be distributed across one or more processing units in one or more locations, e.g., on a client and server. Memory 36 may comprise any known type of data storage and/or transmission media, including magnetic media, optical media, random access memory (RAM), read-only memory (ROM), a data cache, a data object, etc. Moreover, memory 36 may reside at a single physical location, comprising one or more types of data storage, or be distributed across a plurality of physical systems in various forms.

I/O 34 may comprise any system for exchanging information to/from an external resource. External devices/resources may comprise any known type of external device, including a monitor/display, speakers, storage, another computer system, a hand-held device, keyboard, mouse, voice recognition system, speech output system, printer, facsimile, pager, etc. Bus 37 provides a communication link between each of the components in the computer system 30 and likewise may comprise any known type of transmission link, including electrical, optical, wireless, etc. Although not shown, additional components, such as cache memory, communication systems, system software, etc., may be incorporated into computer system 30.

Access to computer system 30 may be provided over a network such as the Internet, a local area network (LAN), a wide area network (WAN), a virtual private network (VPN), etc. Communication could occur via a direct hardwired connection (e.g., serial port), or via an addressable connection that may utilize any combination of wireline and/or wireless transmission methods. Moreover, conventional network connectivity, such as Token Ring, Ethernet, WiFi or other conventional communications standards could be used. Still yet, connectivity could be provided by conventional TCP/IP sockets-based protocol. In this instance, an Internet service provider could be used to establish interconnectivity. Further, as indicated above, communication could occur in a client-server or server-server environment.

Hybrid Trust Anchor

In some applications, it may be desirable to implement a trust anchor that utilizes a multi-pronged approach to authenticate a subscriber. In this manner, an authentication server can be configured to use one of several possible approaches to authentication. The existing SSL/TLS protocol (see, RFC 2246) requires a server to verify that the client certificates presented for authentication are signed by a trusted CA. To achieve this, the server typically stores the list of trusted CA certificates in a server's key store. In addition to verifying that a CA signature is trustworthy, the server can be configured to check a CA-related Certification Revocation List (CRL) to validate client certificates revocation status.

The TLS implementation specified in RFC 2246 assumes that a signing CA certificate (or a corresponding CAs chain) is the only trust anchor that can be used for a client authentication. The present embodiment allows servers to use relying party specific trust anchors that in the general case can be different than signing CAs and corresponding CRLs. It allows enterprises to authenticate users with self-signed certificates or certificates issued by different CAs with inconsistent levels of trust, legal status, business scope and technical implementation.

In accordance with this illustrative embodiment of the invention, the TLS protocol is modified to include relying party specific trust anchor information. It can be either a signing CA or CAs chain outlined in RFC 2246, or a protocol data that is specific for a particular trust anchor implementation. For example, the relying party client's authentication design can be based on the use of self-signed certificates or certificates issued by different CAs. In this particular case, the certificates of the registered users can be stored in a data repository and considered to be trusted by a relying party (e.g., as described above in FIGS. 1 and 2). The client certificates trust and revocation status can be validated against this data repository by using a depository specific protocol (e.g., LDAP, SQL, HTTPS, SOAP, etc.).

The proposed approach includes the following user authentication options:
1. A relying party authentication server receives an authentication certificate (through a digital signature) from a user.
2. Based on relying party trust anchor implementation, the authentication server either:
   a. verifies that the user certificate is signed by a trusted CA published in a server's store of trusted CA certificates (RFC 2246 based approach); or
   b. checks the certificate against an LDAP Directory 56 (alternative trust anchor) or some other data repository 58 of registered user certificates; and/or
   c. sends the received certificate using web services mechanisms to a designated remote web application (alternative trust anchor) for verification.

Figure 3:
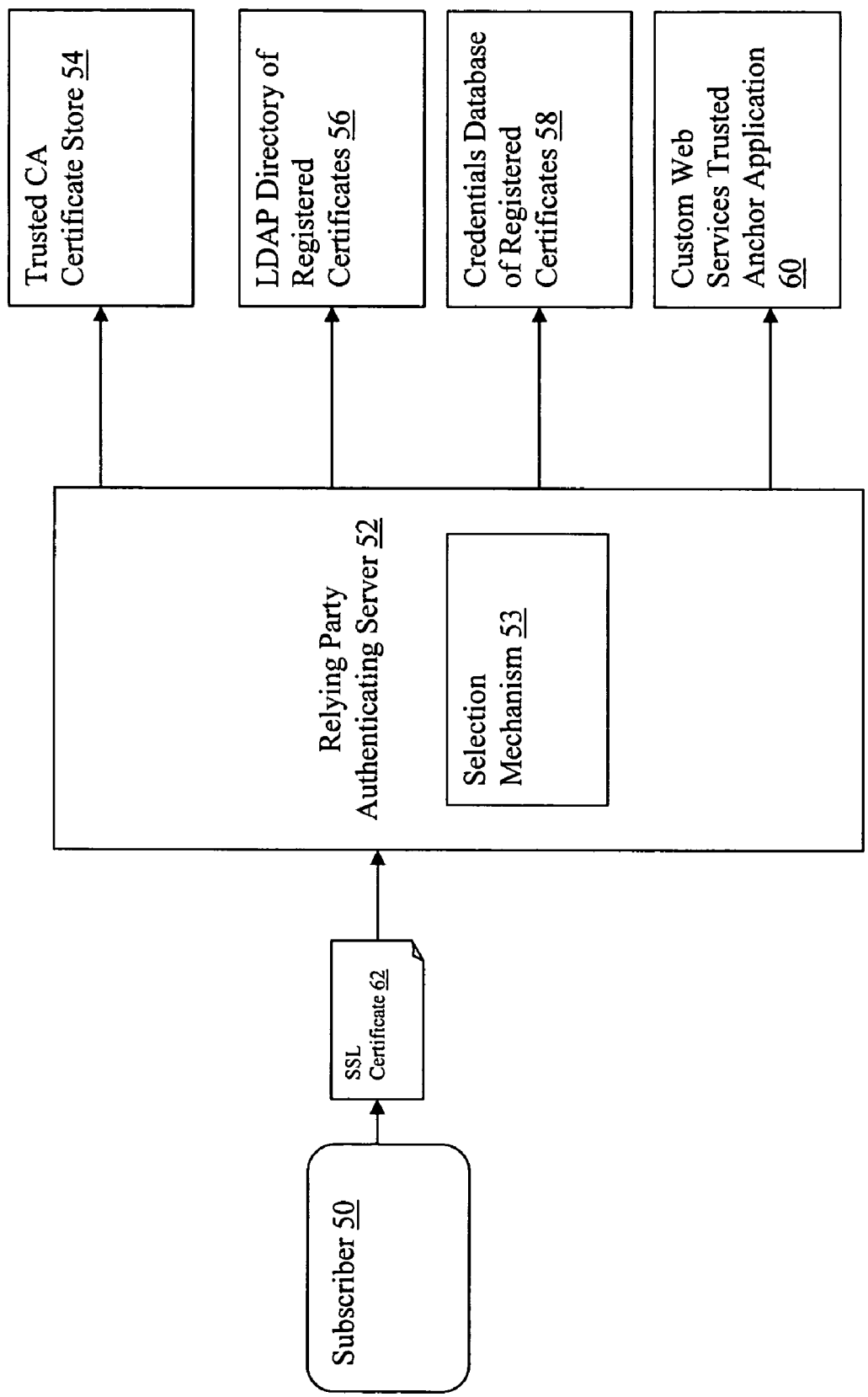
FIG. 3 depicts a hybrid system having a plurality of trust anchor options, in accordance with the present invention.

FIG. 3 depicts an illustrative embodiment for implementing a hybrid trust anchor. In this case, when a subscriber 50 submits an SSL certificate 62 to a relying party authenticating server 52, the relying party authenticating server 52 may use one or more mechanisms for authenticating the subscriber 50. Options include using a trusted CA certificate store 54 (such as EQUIFAX™, GTE™, MICROSOFT™, VERISIGN™, etc.), using an LDAP (Lightweight Directory Access Protocol) Directory of registered certificates 56 or using some other database technology for providing a credentials database of registered certificates 58 (e.g., using an access protocol such as JDBC (Java DataBase Connectivity), ODBC (Open DataBase Connectivity), SQL (Structured Query Language), stored procedures, etc.), or a custom web services trusted anchor application 60 implemented, e.g., using HTTP/SOAP web services.

This approach identifies a variety of trust anchors that can be used by a relying party to more effectively meet various authentication requirements when user authentication certificates are either self-signed or signed by arbitrary CAs. This approach allows the relying party to implement a centralized trust anchor model that can be effectively managed across a distributed large scale enterprise environment.

It should be appreciated that the teachings of the present invention could be offered as a business method on a subscription or fee basis. For example, a trusted entities directory system, or a hybrid system could be created, maintained and/or deployed by a service provider that offers the functions described herein for customers. That is, a service provider could offer to provide trust anchor services as described above.

It is understood that the systems, functions, mechanisms, methods, engines and modules described herein can be implemented in hardware, software, or a combination of hardware and software. They may be implemented by any type of computer system or other apparatus adapted for carrying out the methods described herein. A typical combination of hardware and software could be a general-purpose computer system with a computer program that, when loaded and executed, controls the computer system such that it carries out the methods described herein. Alternatively, a specific use computer, containing specialized hardware for carrying out one or more of the functional tasks of the invention could be utilized. In a further embodiment, part of all of the invention could be implemented in a distributed manner, e.g., over a network such as the Internet.

The present invention can also be embedded in a computer program product, which comprises all the features enabling the implementation of the methods and functions described herein, and which—when loaded in a computer system—is able to carry out these methods and functions. Terms such as computer program, software program, program, program product, software, etc., in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

The foregoing description of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of this invention as defined by the accompanying claims.

The invention claimed is:

1. A public key (PK) framework having a relying party user authentication system for allowing a relying party to authenticate a user, wherein the PK framework places user credentials under the control of the relying party, and wherein the relying party user authentication system includes:
   a storage system for storing certificates received via a secure channel from users in a user credentials data repository that acts as a trust anchor, wherein the certificates are issued by a plurality of different certificate authorities, and wherein the certificates in the user credential data repository are publically available;
   a management system for managing records in the user credentials data repository associated with users; and
   a validation system that retrieves certificates from the user credentials data repository in order to authenticate users, wherein the validation system utilizes a public key obtained from a stored certificate to decrypt a digital signature of a user that was encrypted by the user with an associated private key, and wherein authentication is performed without obtaining a certificate from the user at a time of authentication.

2. The PK framework of claim 1, wherein the certificates stored in the user credentials data repository include self-signed certificates.

3. The PK framework of claim 1, wherein the secure channel comprises SSL with a one-way server authentication.

4. The PK framework of claim 1, wherein the users subscribe to a service provided by the relying party.

5. A method for allowing a relying party to authenticate a user within a public key (PK) framework in which the user credentials are under the control of the relying party, comprising:
   providing a user credentials data repository that is under the control of a relying party;
   storing certificates received from users via a secure channel in the user credentials data repository that acts as a trust anchor, wherein the certificates are issued by a plurality of different certificate authorities;
   allowing the certificates in the user credentials data repository to be publically available;
   receiving a request at the relying party to authenticate a user;
   retrieving a certificate from the user credentials data repository in order to authenticate the user;
   obtaining a digital signature from the user that was encrypted with a private key of the user;
   decrypting the digital signature with a computing device using a public key associated with the certificate retrieved from the user credentials data repository; and
   authenticating the user without receiving a certificate from the user at a time of authentication.

6. The method of claim 5, comprising the further step of allowing the relying party to manage records in the user credentials data repository associated with users.

7. The method of claim 5, wherein the certificates stored in the user credentials data repository include self-signed certificates.

8. The method of claim 5, wherein the secure channel comprises SSL with one-way server authentication.

9. The method of claim 5, wherein the users subscribe to a service provided by the relying party.

10. A method for authenticating users using public key infrastructure (PKI) credentials, comprising the steps of:
    receiving a certificate via a secure channel from a subscriber at a relying party authentication server;
    selecting at least one trust anchor from a plurality of trust anchors to authenticate the subscriber based on the certificate, wherein the plurality of trust anchors for authenticating the subscriber include:
       a key store containing trusted certificate authority certificates;
       a directory of registered certificates; and
       a custom web services user credentials verification application that sends a received certificate to a remote application using web services to verify the received certificate;
    storing the certificate in a user credentials data repository, wherein the certificate in the user credentials data repository is publically available;
    receiving a request at the relying party to authenticate the user during a subsequent session;
    retrieving the certificate from the user credentials data repository;
    obtaining a digital signature from the user encrypted with a private key of the user;
    decrypting the digital signature with a computing device using a public key associated with the certificate retrieved from the user credentials data repository; and
    authenticating the user during the subsequent session without receiving a certificate from the user.

11. The method of claim 10, wherein the directory of registered certificates comprises an LDAP Directory.

12. The method of claim 10, wherein the directory of registered certificates comprises a database using an access protocol selected from the group consisting of: JDBC (Java DataBase Connectivity), ODBC (Open DataBase Connectivity), and SQL (Structured Query Language).

13. The method of claim 12, wherein the users subscribe to a service provided by the relying party.

14. The method of claim 10, wherein the relying party user authentication application is further operable to:
    receive a request to authenticate a user; and
    select at least one trust anchor from a plurality of trust anchors to authenticate the user, wherein the plurality of trust anchors for authenticating the user includes:
       a key store containing trusted certificate authority certificates;
       a directory of registered certificates; and
       a custom web services user credentials verification application.

15. A method for deploying a relying party user authentication application in which user credentials are under the control of a relying party, comprising:
    providing a computer infrastructure being configured to:
    store certificates received from users via a secure channel in a user credentials data repository that is under the control of the relying party, wherein the certificates are issued by a plurality of different certificate authorities, wherein the certificates in the user credentials data repository are publically available;

manage records in the user credentials data repository associated with the relying party;

allow the relying party to retrieve certificates from the user credentials data repository in order to authenticate users;

obtain a digital signature from the user that was encrypted with a private key of the user;

decrypt the digital signature with a computing device using a public key associated with the certificate retrieved from the user credentials data repository; and authenticate the user without receiving a certificate from the user at a time of authentication.

\* \* \* \* \*